(12) United States Patent
Vissenberg

(10) Patent No.: US 8,434,913 B2
(45) Date of Patent: May 7, 2013

(54) ROUND ILLUMINATION DEVICE

(75) Inventor: Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 359 days.

(21) Appl. No.: 12/993,284

(22) PCT Filed: May 20, 2009

(86) PCT No.: PCT/IB2009/052122
§ 371 (c)(1),
(2), (4) Date: Nov. 18, 2010

(87) PCT Pub. No.: WO2009/144638
PCT Pub. Date: Dec. 3, 2009

(65) Prior Publication Data
US 2011/0063855 A1 Mar. 17, 2011

(30) Foreign Application Priority Data
May 30, 2008 (EP) .................................. 08157267

(51) Int. Cl.
*F21V 5/00* (2006.01)

(52) U.S. Cl.
USPC ................................ 362/311.12; 362/311.06

(58) Field of Classification Search ............ 362/311.01, 362/311.02, 311.04, 311.06, 311.08, 311.12
See application file for complete search history.

(56) References Cited

U.S. PATENT DOCUMENTS

| | | | |
|---|---|---|---|
| 6,022,117 A * | 2/2000 | Tenmyo et al. ................ | 362/17 |
| 6,337,946 B1 | 1/2002 | McGaffigan | |
| 6,536,921 B1 | 3/2003 | Simon | |
| 6,592,238 B2 | 7/2003 | Cleaver et al. | |
| 6,607,286 B2 | 8/2003 | West et al. | |
| 6,647,199 B1 | 11/2003 | Pelka et al. | |
| 6,796,680 B1 | 9/2004 | Showers et al. | |
| 6,871,988 B2 | 3/2005 | Gebauer et al. | |
| 7,006,306 B2 | 2/2006 | Falicoff et al. | |
| 7,025,482 B2 | 4/2006 | Yamashita et al. | |
| 7,153,002 B2 | 12/2006 | Kim et al. | |
| 7,181,378 B2 | 2/2007 | Benitez et al. | |
| 7,267,461 B2 | 9/2007 | Kan et al. | |
| 7,329,029 B2 | 2/2008 | Chaves et al. | |
| 2005/0024744 A1 | 2/2005 | Falicoff et al. | |
| 2005/0122742 A1 | 6/2005 | Ho | |
| 2006/0072314 A1 | 4/2006 | Rains | |
| 2006/0104060 A1 | 5/2006 | Kragl | |
| 2006/0126343 A1 | 6/2006 | Hsieh et al. | |
| 2007/0086211 A1 | 4/2007 | Beeson et al. | |
| 2007/0274079 A1 | 11/2007 | Poh et al. | |
| 2007/0274095 A1 | 11/2007 | Destain | |
| 2008/0030691 A1 | 2/2008 | Godo | |
| 2008/0068852 A1 | 3/2008 | Goihl | |
| 2009/0196071 A1 * | 8/2009 | Matheson et al. ............ | 362/623 |

* cited by examiner

FOREIGN PATENT DOCUMENTS

| | | |
|---|---|---|
| JP | 2000307807 A | 11/2000 |
| WO | 2008007315 A1 | 1/2008 |
| WO | 2008047278 A2 | 4/2008 |
| WO | 2007087710 A1 | 8/2008 |

*Primary Examiner* — David V Bruce
(74) *Attorney, Agent, or Firm* — Mark L. Beloborodov

(57) ABSTRACT

The invention provides a substantially round illumination device (1) comprising a light source (10) and a substantially round waveguide (20). The waveguide (20) comprises a first waveguide surface (21), a second waveguide surface (22), a substantially round waveguide entrance window (23), a substantially round waveguide edge window (24), and a central axis (100). The first waveguide surface (21) or the second waveguide surface (22) or both the first waveguide surface (21) and the second waveguide surface (22) further comprise a plurality of elongated structures (200) each having an elongation axis (201) substantially parallel to a radius (101) perpendicular to the central axis (100).

11 Claims, 12 Drawing Sheets

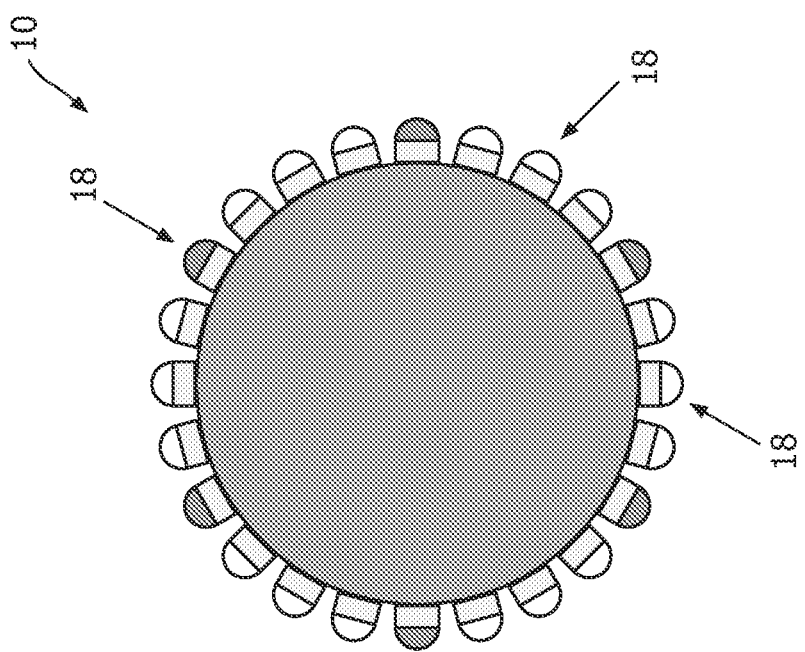

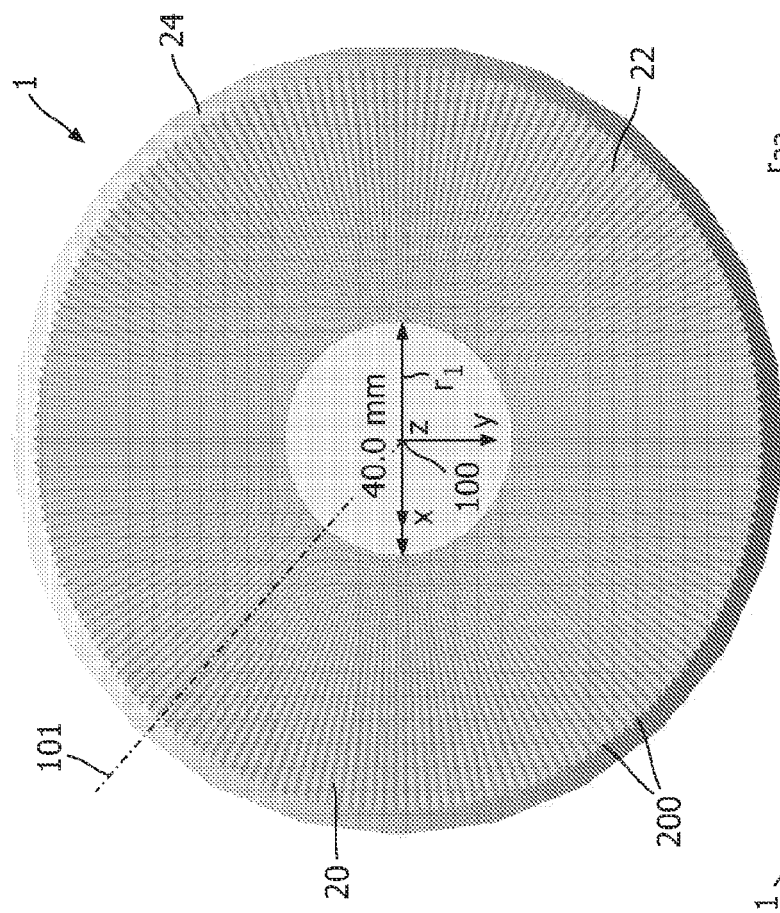
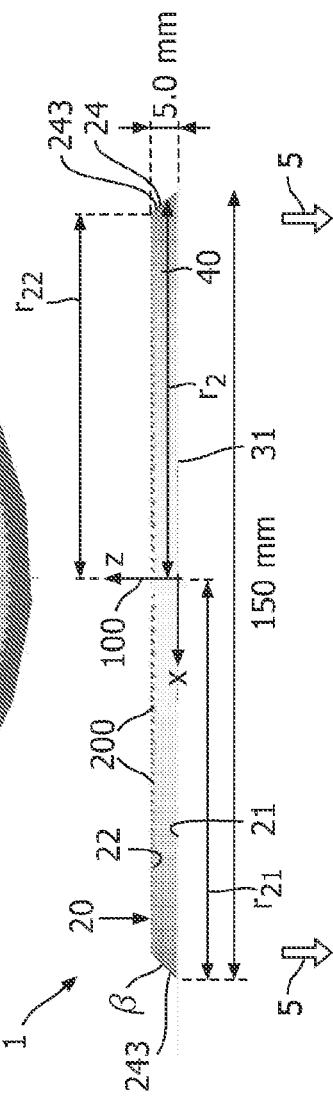
FIG. 6a
FIG. 6b

ROUND ILLUMINATION DEVICE

FIELD OF THE INVENTION

The invention relates to a round illumination device comprising a light source and a waveguide arranged to collimate the light, wherein the waveguide comprises a first waveguide surface, a second waveguide surface, a waveguide entrance window, and a waveguide edge window.

BACKGROUND OF THE INVENTION

Relatively flat and round light sources are known in the art and are for instance described in U.S. Pat. No. 7,025,482 and U.S. Pat. No. 7,181,378.

U.S. Pat. No. 7,025,482 for instance describes a light guide member and an illuminating device which are able to efficiently and uniformly radiate illumination light to only an area requiring illumination. Therefor, a reflection face is formed by reflection stripes, such as a large number of grooves, etc. widened in a concentric circle shape. Light from a light source unit is widened toward this entire reflection face without irregularities by a diffusing portion such as a reflection prism, etc. Thus, only the range actually requiring the illumination can be illuminated without irregularities, and visibility of the illumination range using a front light is raised.

U.S. Pat. No. 7,181,378 describes apparatuses and methods of manufacturing such apparatuses to convert a first distribution of input radiation to a second distribution of output radiation. The apparatus can be defined in some embodiments by generating a two-dimensional representation of three active optical surfaces including calculating a segment of first, entry and second surfaces based on first, second, and third generalized Cartesian ovals, respectively, and successively repeating the calculating of the segments of the first and second surfaces, and rotationally sweeping the two-dimensional representation about a central axis, providing a three-dimensional representation. In some embodiments, a portion of the first and/or second surfaces can be totally internally reflective (TIR). This document especially describes a folded-optics apparatus comprising a body that receives light, the body comprising first, second and third surfaces; the third surface defining a cavity, and at least a portion of the third surface being refractive; the second surface extending generally radially away from the cavity, and the second surface comprising a reflective region; and at least a first portion of the first surface providing internal reflection folding and at least a second portion of the first surface providing refractive transition between the body and an exterior of the body.

Further, WO2008047278 describes a luminaire comprising a light guiding layer and a plurality of LEDs, which LEDs are accommodated in at least one hole arranged in the light guiding layer, for emitting light into the light guiding layer. The light guiding layer further comprises at least one outcoupling structure, for coupling the light out of the light guiding layer.

SUMMARY OF THE INVENTION

Circular light guides may have the advantage that the collimation along the azimuth direction can relatively simply be improved by increasing the radius of the light outcoupling region with respect to the radius of the source (or light incoupling region). However, for a well-controlled beam also the radial direction needs to be collimated.

In a flat transparent lamp, the radial collimation may be done by collimating optics on the LED (for instance, the side-emitter package has a light distribution that is peaked in the plane of the light guide). For applications that require a highly collimated beam (such as a spot light), the collimation in the azimuth direction can be improved by enlarging the light guide radius. However, an improved collimation in the radial direction requires larger collimating optics on the LED, which results in a thicker system. This deteriorates the slim appearance of the system. In particular, control over both directions of collimation is needed to control the beam cut-off at the tail of the light distribution. This beam cut-off is essential to comply with European regulations with respect to glare from general illumination devices.

Therefore, flat circular light guides may allow in fact unlimited collimation along the azimuth direction, simply by increasing the radius of the light guide. However, in order to produce a well-collimated beam, the radial direction must also be controlled. For highly collimated beams, this would result in an unwanted increase in thickness of the collimating LED optics, if used.

Therefore, there is a desire to provide an alternative flat circular illumination device based on a light guide, and to further improve the beam shape of such flat circular light guides.

Hence, it is an aspect of the invention to provide an alternative illumination device, which preferably further obviates one or more of the above-described drawbacks, and which preferably provides a collimated beam.

According to a first aspect, the invention provides a substantially round illumination device arranged to provide illumination device light, the illumination device comprising a light source and optional optics arranged to radially generate light source light, and a substantially round, and preferably substantially planar, waveguide arranged to collimate the radially generated light, wherein the waveguide comprises a first waveguide surface, a second waveguide surface, a substantially round waveguide entrance window, a substantially round waveguide edge window, and a central axis, wherein:

the first waveguide surface or the second waveguide surface or both the first waveguide surface and the second waveguide surface further preferably comprise a plurality of elongated structures each having an elongation axis substantially parallel to a radius perpendicular to the central axis, and the waveguide entrance window at least partially encloses the light source and is arranged to receive the radially generated light source light from the light source.

In an embodiment, the waveguide entrance window is arranged substantially perpendicularly to the first waveguide surface and the second waveguide surface and substantially parallel to the central axis. In yet a further embodiment, the first waveguide surface and the second waveguide surface are arranged so as to be substantially parallel. Thereby, they form a substantially planar waveguide. Herein, the invention is especially described in relation to substantially round and substantially planar waveguides. Such waveguides are substantially round (see the herein defined substantially round entrance window and substantially round waveguide edge) and substantially planar (see the herein defined substantially parallel arranged first and second waveguide surfaces).

The substantially round and substantially planar waveguides are for the sake of brevity herein also indicated as "planar waveguides", or "waveguides" for short. For the sake of brevity, the term "round" is used as short for "substantially round" and the term "planar" is used as short for "substantially planar". Likewise, the terms "illumination device" or "device" are herein used for the substantially round illumination device. Also, the terms "substantially round waveguide entrance window" and "substantially round waveguide edge window" are for the sake of brevity indicated herein as "entrance window" or "waveguide entrance window" and "edge window" or "waveguide edge window", respectively. Herein, terms like "perpendicular", "parallel", "planar" and "flat", especially relate to embodiments having substantially perpendicular, substantially parallel, substantially planar and substantially flat features, as will be clear to the skilled person in the art.

In a further embodiment, the waveguide edge window is arranged to provide the illumination device light. In another embodiment, the edge window is arranged to reflect the light source light to the exterior of the illumination device, thereby providing illumination device light. The edge window may also be indicated as outcoupling structure, which is arranged to couple out the light, either "directly" via transmission through the edge window or "indirectly" via reflection and subsequent transmission (especially through one of the first or the second waveguide surface).

It surprisingly appears that such a device may provide a beam with an advantageous beam shape, which may be well collimated.

Without being bound to any theory, it seems that by applying, according to a preferred embodiment, elongated structures (herein also indicated as "grooves") on the first and/or second waveguide surface (also indicated as top and/or bottom surface) of the light guide, along the radial direction in which the light source light is travelling, collimation improves. It seems that by reflection off these grooves, the azimuth direction of a light source light ray is mixed with the direction perpendicular to the guide. While the light is travelling in the radial direction, only the azimuth direction is collimated. The mixing of the two directions ensures that both directions of the light source light will become collimated. Consequently, the beam collimation in both directions will improve with increasing radius, without changing the other optical components, in particular: without increasing the thickness of the system.

The term "substantially round" refers to circles (such as a circularly shaped (planar) waveguide), ellipses (such as an elliptically shaped (planar) waveguide), but also to circle sectors (such as a planar waveguide having the shape of a circle sector ("wedge of cake")) and to ellipse sectors (such as a (planar) waveguide having the shape of a sector of an ellipse).

In the case of an elliptical waveguide, the centre of the ellipse, i.e. a point inside the ellipse which is the midpoint of the line segment linking the two foci (or the intersection of the major and minor axes), is on the central axis.

Further, the term "substantially round" may also refer to structures that have an angled edge, such as a hexagonal waveguide, having an edge with 6 angles and 6 edges, and higher order polygonal shapes, such as an octagonal waveguide (8 angles/8 edges), etc. Here, it is especially referred to regular convex polygons (polygons which are equiangular (all angles are congruent) and equilateral (all sides have the same length), and which are convex), such as a waveguide having the shape of a regular hexagon, octagon, decagon, etc. When substantially round structures are used having polygonal shapes, such as a waveguide having a polygonal shape, the number of edges (or angles or vertices) n is at least 6, more preferably at least 10, even more preferably at least about 24. Hence, in a specific embodiment, especially for substantially circular or substantially elliptical shapes, the illumination device has a polygonal shape, wherein the number of edges n is preferably at least 6. An advantage of using hexagons (i.e. n=6) is that they can be used to cover a planar area without gaps. Thus, an illuminating area source can be constructed by combining several hexagon-shaped sub-systems.

In a preferred embodiment, the illumination device has a circular shape. In another embodiment, the illumination device has an elliptical shape.

In an embodiment, the light source comprises a plurality of LEDs (light emitting diodes). Especially, in an embodiment, the light source comprises a plurality of LEDs which are arranged in a substantially round configuration, enabling the light source to radially generate light source light. For instance, the LEDs may be arranged in a circle and thereby form a circular light source generating radial light source light (i.e. light in radial directions). The plurality of LEDs may, in an embodiment, comprise LEDs of the same emission colour, but may also comprise LEDs of different emission colours (such as yellow and blue LEDs, or red, green and blue LEDs, etc.).

A LED or a plurality of LEDs may, in an embodiment, also be surrounded by luminescent material, arranged to absorb at least part of the LED emission and emit luminescent material light at another wavelength. For instance, the light source may comprise a blue LED or a plurality of blue LEDs at least partially enclosed by windows comprising luminescent material arranged to absorb and convert at least part of the blue emission, such as YAG:Ce and analogous compounds. In an embodiment, the light source comprises a plurality of LEDs and the entrance window comprises a luminescent material (such as blue LEDs and YAG:Ce and analogous compounds), arranged to absorb and convert at least part of the LED emission. Other luminescent materials, or combinations of luminescent materials, are known to the person skilled in the art. The illumination device light from the illumination device may be white, but may also be coloured. Optionally, in an embodiment the colour of the illumination is variable and controllable.

The light sources may also comprise light sources other than LEDs, such as for instance compact fluorescent lamps, halogen lamps or laser diodes, etc.

In an embodiment, the light source cavity is closed by one or two caps, selected from the group consisting of diffuser caps and reflector caps. A diffuser cap may improve the light mixing quality of the cavity, i.e. the contributions of individual light sources within the cavity are less distinguishable. This may be particularly important when LEDs of different colours are used. Without a diffuser, unwanted colour effects may be visible to anyone looking into the lamp, but also in the light beam itself (colour variations in the illuminated area, coloured shadows). The diffuser cap(s) and/or reflector cap(s) promote incoupling of the light source light into the waveguide. A diffuser and/or reflector cap may not only cover the light source cavity, but may also cover at least part of the waveguide surface, thereby promoting outcoupling of the light at or close to the edge window. The one or two cavity caps can be considered as (preferred) optional optics.

The waveguide entrance window has an entrance window radius relative to the central axis, and the waveguide edge window has an edge window radius relative to the central axis. Especially, the ratio of the edge window radius and the entrance window radius is equal to or larger than about 1.5 (i.e.: (edge window radius)/(entrance window radius)$\geq$about 1.5, preferably $\geq$about 2, even more preferably $\geq$about 4), and in general not larger than about 150. This may depend on the required beam collimation. Wide-beam down lighting applications may need a small ratio, while spotlighting applications may need a large ratio. For very narrow beams (2×6° beam width or less), a ratio of 100 is not unthinkable.

The waveguide of the illumination device may essentially consist of two reflective plates, wherein the entrance window and/or the edge window may comprise a solid transparent material or may alternatively be open. Hence, the waveguide of the illumination device may, in an embodiment, essentially consist of two reflective plates with air in between (for brevity also indicated as "open waveguide").

However, in a preferred embodiment, the waveguide comprises a solid transparent waveguide, especially a planar solid transparent waveguide (such as a plate). The solid transparent waveguide may comprise a material selected from the group consisting of PET (polyethylene terephthalate), PE (polyethylene), PP (polypropylene), PC (polycarbonate), P(M)MA (poly(methyl)metacrylate), PEN (polyethylene naphthalate), PDMS (polydimethylsiloxane), and COC (cyclo olefin copolymer). PMMA for instance gave good results. However, in another embodiment the transmissive window comprises an inorganic material. Preferred inorganic materials are selected from the group consisting of glasses, (fused) quartz, ceramics, and silicones.

When the waveguide comprises a solid transparent material, due to total internal reflection (TIR), the first and/or second waveguide surface do not necessarily comprise a reflective material, since they are per definition reflective due to TIR. However, when the waveguide essentially consist of two reflective plates with air in between (with the entrance window and/or the edge window optionally comprising a solid transparent material), the first and the second waveguide surface preferably comprise a reflector.

When the waveguide comprises a solid transparent material, and the edge window is slanted, the edge window is especially arranged to reflect the light source light to the exterior of the illumination device, thereby providing illumination device light. In such embodiments, the edge window may further optionally comprise a reflector or a diffuser. Outcoupling of the light source light may in such an embodiment occur via the first or the second waveguide surface.

In an embodiment, the elongated structures have v-shaped profiles. In another embodiment, the elongated structures have curved profiles, such as sine-like shapes. As will be clear to a person skilled in the art, combinations of differently shaped elongated structures may also be applied. Preferably, both the first waveguide surface and the second waveguide surface comprise these elongated structures. Due to the nature of the illumination device, the elongated structures have an elongation axis preferably substantially parallel to a radius perpendicular to the central axis, and (thus) also substantially parallel to a ray (or radius) of the light source. Preferably, a part of the total number of the elongated structures (such as 10-100%, especially 20-100% of the total number of elongated structures) have a length in the range of about 50-100% of a radial length of the waveguide (i.e. the difference in length between the edge window radius and the entrance window radius of the first waveguide surface and/or second waveguide surface, respectively). The elongated structures may have a constant width and/or height, or the width and/or height, independently of each other, may vary over a radius of the waveguide. In this way, the entire surface of the first waveguide surface and/or the second waveguide surface may comprise the elongated structures, but it may also be chosen to have interspaces between two adjacent elongated structures. The phrase "the elongated structures have an elongation axis preferably substantially parallel to a radius" indicates that the elongated structures are arranged in a substantially radial direction (relative to the central axis).

As mentioned above, the, preferably planar, waveguide may comprise a circle or an ellipse, preferably a circle, but may in another embodiment also comprise a sector of a circle or of an ellipse. Hence, in an embodiment, the waveguide extends over a waveguide azimuth angle in the range of about 2-360°, wherein preferably the waveguide comprises at least 1 elongated structure per 10°, more preferably at least 2. In an embodiment, the waveguide extends over a waveguide azimuth angle, relative to the radius perpendicular to the central axis, to the central axis in the range of about 20-180°. In yet another embodiment, the waveguide extends over a waveguide azimuth angle, relative to the radius perpendicular to the central axis, to the central axis in the range of about 180-360°, such as for instance 270°. In another embodiment, the waveguide extends over a waveguide azimuth angle, relative to the radius perpendicular to the central axis, to the central axis of 360° (i.e. a circle (or an ellipse)).

In an embodiment, the edge window has a slant angle relative to the first waveguide surface or the second waveguide surface in the range of about 85-105°. This also implies that the edge window radius of the first waveguide surface is shorter (or longer) than that of the second waveguide surface (except for an angle of about 90°). Especially, the edge window has a slant angle relative to the first waveguide surface or the second waveguide surface in the range of about 35-55°, especially about 40-50°, more especially about 45°. Slant angles in the range of about 85-105° are especially useful when the edge window is arranged to transmit the light source light and couple this light source light out as illumination device light. Slant angles in the range of about 35-55° are especially useful when the edge window is arranged to reflect the light source light and couple this light source light out as illumination device light via the first or the second waveguide surface. In the former embodiment, the edge window may further comprise a diffuser; in the latter embodiment the edge window may further preferably comprise a reflector.

Assuming an edge window comprising a solid transparent material, the edge window may be flat, but may also be facetted. Hence, in an embodiment, the waveguide comprises a facetted edge window.

In another embodiment, the edge window is curved (i.e. not only a curvature in a plane perpendicular to the central axis, but also curved in a plane parallel to and including the central axis). Note that the term flat here refers to the edge of the edge window in a plane parallel to and including the central axis (in a plane perpendicular to the central axis, the edge window is substantially round). Here, the phrase "curved edge window" and similar phrases refer to an edge window of which the slant angle varies (in a plane parallel to and including the central axis). The phrase "in a plane parallel to and including the central axis" refers to virtual planes which include the central axis and which are parallel to this axis. Assuming an xyz coordinate system, with z as central axis, an xz-plane or yz-plane is a plane parallel to and including the central axis.

In another specific embodiment, the edge window has a V-shaped profile, i.e. it has a slant angle relative to the first waveguide surface and has another slant angle relative to the second waveguide surface. Such an embodiment may be applied to couple out light to both sides of the illumination device, i.e. to a side away from the first waveguide surface and to a side away from the second waveguide surface.

In an embodiment, the waveguide may comprise a plurality of (slanted) edge windows. This may for instance be obtained by providing (an) additional reflective (slanted) surface(s) in the waveguide, for instance by introducing (slanted) slits in the waveguide. Such (slanted) slits may also act as reflectors (like a slanted edge window), and thereby act as additional edge windows. The slant angles of the individual edge windows may be independent of each other. Note that the slant angle may in principle also vary for one and the same edge window (i.e. vary in a plane perpendicular to the central axis). As mentioned above, the slanted edge window may further comprise a reflector or a diffuser.

Herein, the term light guide or waveguide are interchangeably used.

BRIEF DESCRIPTION OF THE DRAWINGS

Embodiments of the invention will now be described, by way of example only, with reference to the accompanying schematic drawings, in which non-limiting substantially planar waveguides are schematically depicted, in which corresponding reference symbols indicate corresponding parts, and in which:

FIGS. 6a-6b schematically depict an example of an embodiment of the illumination device according to the invention.

DESCRIPTION OF PREFERRED EMBODIMENTS

Figure 1A:
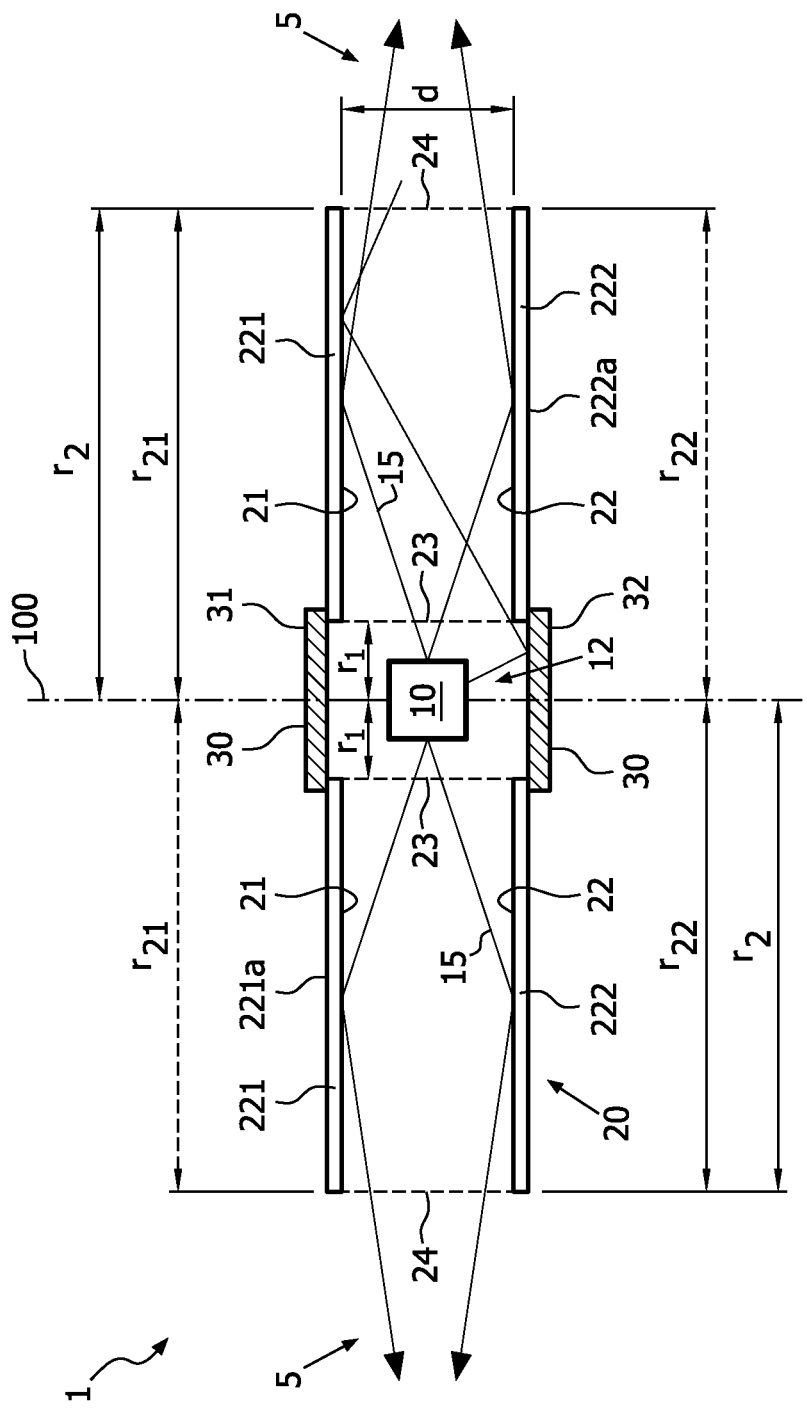
FIGS. 1a-1b schematically depict in a side view embodiments of the illumination device according to the invention.
Figure 1B:
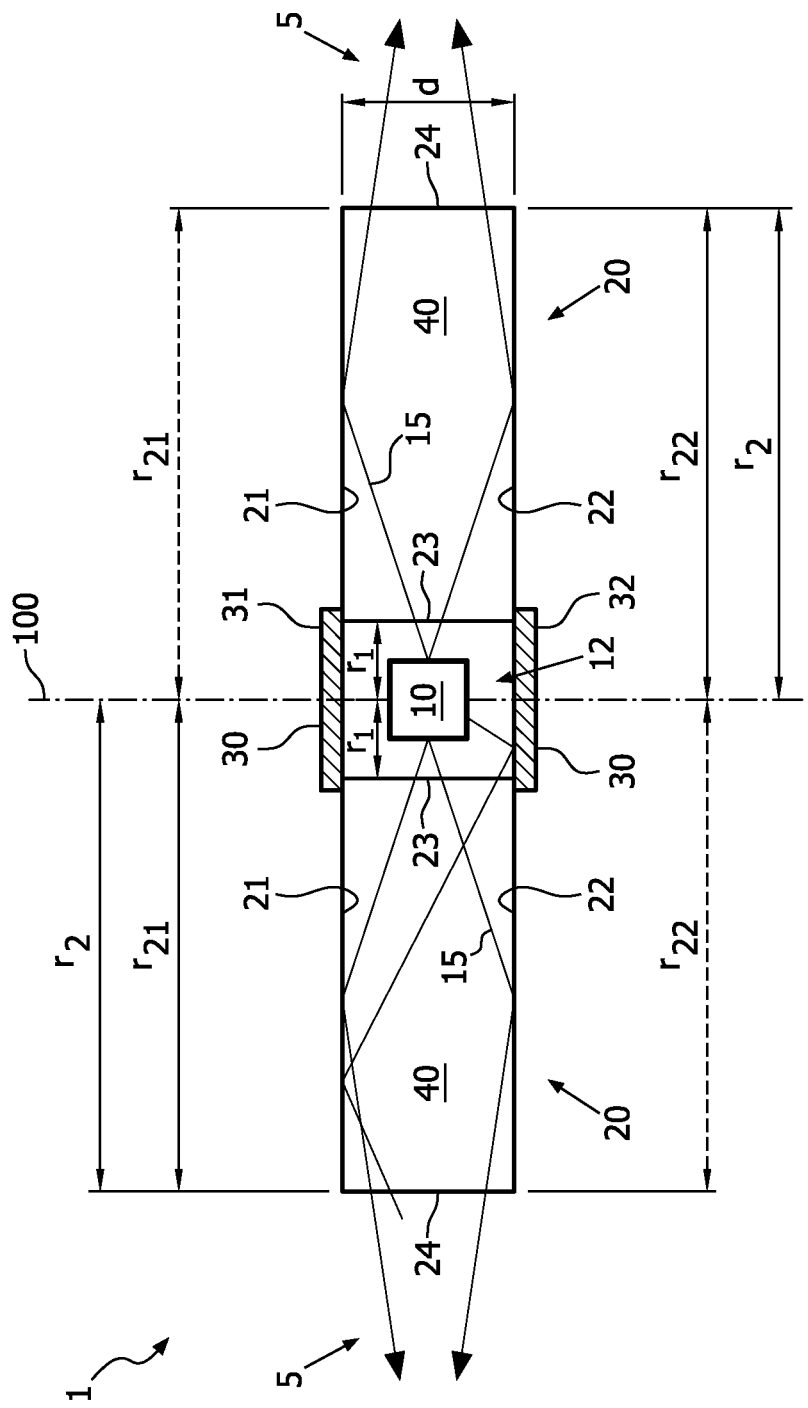

FIGS. 1a-1b schematically depict in a side view embodiments of the illumination device according to the invention. For the sake of clarity, not all details (such as the elongated structures) are depicted in these schematic drawings.

In said side view, a substantially round illumination device 1 is depicted, which is arranged to provide illumination device light 5 ("device light"). The illumination device 1 comprises a light source 10 and in this embodiment optional optics 30 arranged to radially generate light source light 15. The optional optics 30 may for instance be mirrors or diffusers (or a mirror and a diffuser), here indicated as first cavity cap 31 and second cavity cap 32. These optional optics are especially arranged to promote guiding the light source light 15 into the waveguide (see below) and/or, in an embodiment, to promote mixing of the light (if applicable).

The illumination device 1 further comprises a substantially round and substantially planar waveguide 20 arranged to collimate the radially generated light source light 15. The waveguide 20 comprises a first waveguide surface 21 (which in this schematic drawing can also be indicated as top waveguide surface 21) and a second waveguide surface (22) (which in this schematic drawing can also be indicated as bottom waveguide surface 22), a substantially round waveguide entrance window 23 ("entrance window"), a substantially round waveguide edge window 24 ("edge window"), and a central axis 100. The central axis 100 may especially be in one or more planes of symmetry, especially in the case of rotationally symmetric devices (such as circularly shaped illumination devices). The central axis 100 may also be perpendicular to a symmetry face, as it is the case in the schematic drawing of FIGS. 1a and 1b. The term symmetry especially relates to the arrangement of the waveguide 20 and waveguide surfaces 21,22. Note that the term "symmetry" especially refers to the symmetry of the waveguide 20.

The first waveguide surface 21 and the second waveguide surface 22 are, in an embodiment, arranged substantially parallel to each other, as depicted in FIGS. 1a and 1b. Hence, the waveguide is herein indicated as planar waveguide 20. The waveguide 20 is especially configured to surround at least partially (see below) or substantially entirely (circular or elliptical) the central axis 100 and extend radially outward to the edge, i.e. edge window 24.

In principle, the first waveguide surface 21 and the second waveguide surface 22 may also be not substantially parallel. Hence, in an embodiment, the thickness d (see below) increases in a radial direction, and in another embodiment, the thickness d decreases in a radial direction. In the herein described and schematically depicted embodiments, the thickness d is substantially constant along a certain radius 101 ("planar waveguide").

In a preferred embodiment and in the herein schematically depicted embodiments, the waveguide entrance window 23 is arranged substantially perpendicularly to the first waveguide surface 21 and the second waveguide surface 22 and is arranged substantially parallel to the central axis 100. Substantially parallel to the central axis 100 herein refers to an angle of the entrance window 23 and the central axis of about 0°, but especially less than about 6°, more preferably less than about 2°. In the herein schematically depicted embodiments, the entrance window 23 is arranged substantially perpendicularly to the first waveguide surface 21 and the second waveguide surface 22.

In embodiments wherein the entrance window 23 does not comprise a solid transparent material, such as schematically depicted in FIG. 1a, the entrance window 23 is assumed to be by definition substantially parallel to the central axis 100.

The waveguide 20 can be a hollow, wherein the first waveguide surface 21 and the second waveguide surface 22 enclose or "sandwich" a gas, such as air, as schematically depicted in FIG. 1a, but can also be a solid transparent waveguide 40, as schematically indicated in FIG. 1b. In the former embodiment ("open waveguide"), as schematically depicted in FIG. 1a, the waveguide 20 of the illumination device 1 may essentially consist of two reflective plates, indicated with references 221 and 222, having first and second waveguide surfaces 21 and 22, respectively. In this embodiment, the first and the second waveguide surfaces 21,22 preferably comprise a reflector. Optionally, the plates 221 and/or 222 are transparent, but the outer surface(s) (indicated with references 221a and 222a, respectively) comprise reflectors. In the latter embodiment ("solid transparent waveguide"), schematically depicted in FIG. 1b, total internal reflection at the first and the second waveguide surfaces 21,22 appears and these surfaces do not necessarily also comprise a reflector (although this may be possible).

Hence, in an embodiment, the waveguide 20 essentially consists of two reflective plates 221, 222, with a gas, such as air, in between, and with first and second waveguide surfaces 21 and 22, respectively. Hence, in another embodiment, the waveguide 20 comprises a solid transparent waveguide 40. Solid transparent waveguides 40 may for instance essentially consist of glass or Perspex, or other materials, as mentioned herein.

In embodiments wherein the waveguide 20 comprises such a solid transparent material and is thus a solid transparent waveguide 40, the entrance window 23 and the edge window 24 comprise solid transparent materials.

When the waveguide 20 comprises a solid transparent waveguide 40, the entrance window 23 and the edge window 24 will especially be the edges of the waveguide 20. When the waveguide 20 is hollow, i.e. there is substantially no waveguide material between the first and second waveguide surfaces 21,22, the entrance window 23 and the edge window 24 may independently be closed or open. FIG. 1a schematically depicts an embodiment wherein both windows 23,24 are open. The entrance window 23 or the edge window 24 or both the entrance window 23 and the edge window 24 may further comprise optical elements such as diffusers, phosphor layers, lens arrays, etc. Further, edge window 24 may optionally comprise a reflector. Although, in embodiments, the edge window 24 may be open, for the sake of clarity, this part of the waveguide 20 is still indicated as waveguide edge 24, although not literally being a physical edge.

Hence, the two waveguide surfaces 21,22 are preferably material-air interfaces, such that they may reflect via TIR. They may also be provided with metal or dielectric reflectors, but (because of absorption losses) preferably not in optical contact with the waveguide material (unless this is air). The entrance window 23 is transparent, or at least translucent. The entrance window 23 may be either air or an air-transparent material interface. At the exit of the light source cavity 12 and/or at the entrance of the waveguide 20 (i.e. downstream of the light source 10 and at or upstream of the entrance window 23), there may also be a phosphor and/or a diffuser (as optional optics 30).

The term "round" especially refers to the edges of the waveguide 20, i.e. the windows 23 and 24. These windows are round or curved. Here, the term "round" relates to the curvature in a plane perpendicular to the central axis 100 (see also FIGS. 2a-2e, 4a and 4f).

Preferably, the entrance window 23 is arranged parallel to the central axis 100 (see above). In this way, a kind of cylindrical cavity (including elliptically cylindrical cavity) is obtained. The central cavity or light source cavity is indicated with reference 12. Hence, the waveguide entrance window 23 at least partially encloses the light source 10. Here, the phrase "at least partially encloses the light source 10" is applied, since the waveguide is not necessarily an entire circle or ellipse (see below). Therefore, in an embodiment, the waveguide 20 is especially configured to surround at least partially (see below) or substantially entirely (circular or elliptical) the light source cavity 12 and extend radially outward to the edge, i.e. edge window 24.

Hence, this waveguide entrance window 23 is also arranged to receive the radially generated light source light 15 from the light source 10. Referring to FIGS. 1a and 1b, and other schematically depicted embodiments herein, the illumination device 1 can also be described as a disc-like lamp, with a disc-shaped waveguide, with a central cavity or light source cavity 12. Therefore, in a convenient embodiment, the first cavity cap 31 and the second cavity cap 32 are arranged to close the light source cavity 12, substantially accommodated by the entrance window 23.

For the sake of clarity, the optional presence of a heat sink is not included in the schematic drawings.

The waveguide edge window 24 is arranged to promote outcoupling of the illumination device light 5, i.e. it allows at least part of the light source light 15 to escape from the waveguide 20 of the illumination device 1 to the exterior. The edge window 24 may be slanted or not (see below). Promoting outcoupling of the light source light as illumination device light 5 may be achieved by reflection at this edge window 24 (and subsequent transmission at first waveguide surface 21 or second waveguide surface 22) and/or by transmission through the window itself. When the edge window 24 is open, transmission will occur at this edge window 24; however, when the edge window 24 comprises a solid transparent material, such as in the case of a solid transparent waveguide 40, transmission and/or reflection may occur (see also below), depending on the slanted edge.

The central axis 100 is an axis around which the waveguide is arranged. At least part of the light source 10 may coincide with part of this central axis 100 (as depicted in these drawings). The central axis 100 may also be seen as a virtual origin of all device light 5, since the light source 10, the optional optics 30, and the waveguide 20 are especially arranged to provide a round device wherein virtually all device light 5 originates from the central axis 100. This does not necessarily imply that the light source 10 completely coincides with the central axis 100 (see for instance FIG. 4g). In fact, light sources such as LEDs may be placed anywhere inside the cavity 12, as long as the light from the light source is sufficiently scattered (for instance by one or more diffusers as optional optics 30) to avoid distinguishing individual sources.

The waveguide thickness, i.e. the distance between the first waveguide surface 21 and the second waveguide surface 22 is indicated with reference "d". The distance from the entrance window 23 to the central axis, i.e. in fact the radius of the light source cavity 12, is indicated with reference r1. This radius is herein also indicated as "entrance window radius" r1 and can also be indicated as "inner radius" of the waveguide 20. The outer radius of waveguide 20 is indicated with reference r2. Actually, there can be different radii, since, as shown below, the first waveguide surface 21 and the second waveguide surface 22 do not necessarily have the same radius. Hence, the radius of the first waveguide surface 21 is indicated with reference r21 and the radius of the second waveguide surface 22 is indicated with reference r22. The mean radius (over the height or thickness d) is indicated with outer radius r2. The radii r2, r21 and r22 may not only vary over the thickness d of the waveguide 20, but also in a plane perpendicular to the central axis 100. For instance, the waveguide 20 may also be elliptical (see below). The term "mean radius r2" only refers to the mean radius over thickness d in a plane parallel to central axis 100 and containing central axis 100.

In a preferred embodiment, the ratio of the edge window radius r2 and the entrance window radius r1 is equal to or larger than about 2, especially ≧about 4, and in general not larger than about 150. Such embodiments provide in general a good azimuthal collimation, and especially in combination with the elongated structures, see below, also a good radial collimation.

Schematically, it is shown how some light rays (indicated with reference 15) originating from light source 10 may propagate through the waveguide 20.

The elongated structures will be discussed below with reference to FIGS. 4a-4f, but first the principles of the illumination device 1 will be further discussed.

FIGS. 2a-2e schematically depict top-view embodiments of the illumination device according to the invention. For the sake of clarity, optional optics 30, such as first cavity cap 31, are not depicted. As mentioned above, the substantially round illumination device 1 comprising the substantially round planar waveguide 20 may have different shapes. FIGS. 2a-2e depict a number of those embodiments, which are not to be construed in a limiting manner.

Figure 2A:
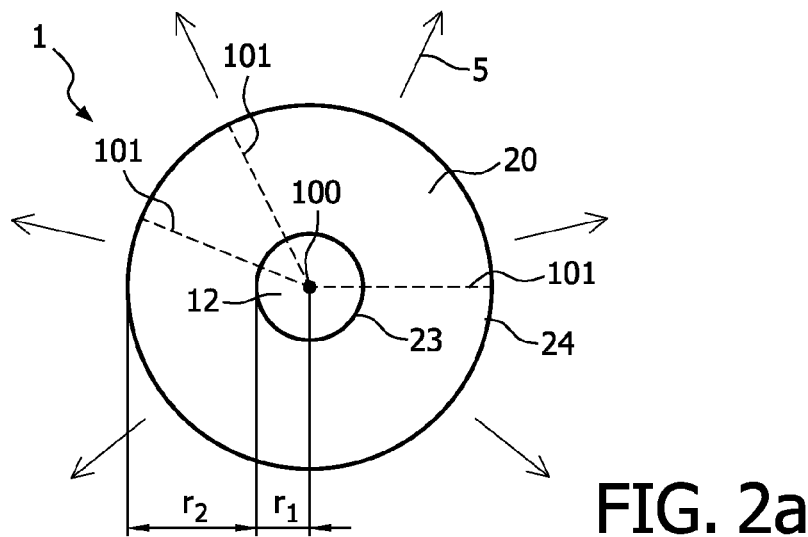
FIGS. 2a-2e schematically depict in a top view embodiments of the illumination device according to the invention.

FIG. 2a schematically depicts a circular device. Hence, in a specific embodiment, the illumination device 1 has a circular shape. From this top view, it appears that the central cavity is round, here, in this embodiment, circular, and the entrance window 23 is substantially rotationally symmetrical around the central axis 100. Also, the waveguide 20 has a round edge, i.e. the edge window 24 is round, here circular. In this embodiment, thus, also the edge window 24 is substantially rotationally symmetrical around the central axis 100. In principle, a circularly shaped waveguide 20 does not necessarily require a circularly shaped central cavity 12. For the sake of understanding, radii perpendicular to the central axis 100 are drawn, which are indicated with references 101.

Figure 2B:
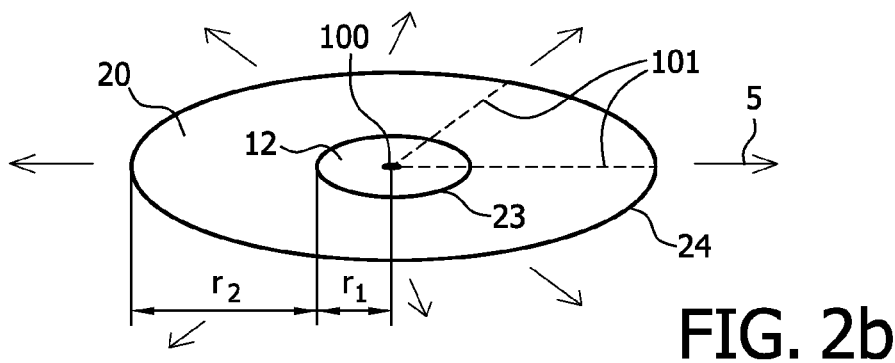

In another embodiment, the illumination device 1 has an elliptical shape. This embodiment is schematically depicted in FIG. 2b. In principle, an elliptically shaped waveguide 20 does not necessarily require an elliptically shaped central cavity 12. Hence, the shape of the light source cavity 12 and of the edge window 24, herein both circular in FIG. 2a and both elliptical in FIG. 2b, do not necessarily have the same shape.

Figure 2C:
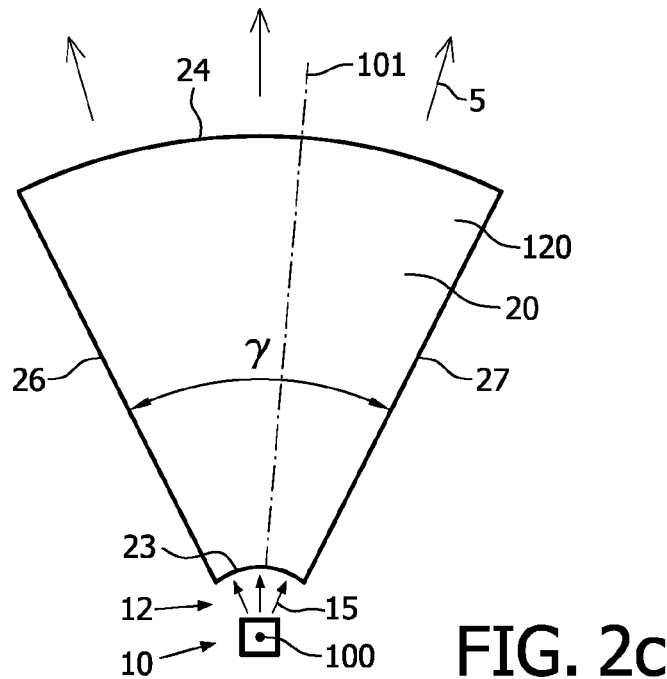

Referring to FIGS. 2a-2b, selecting a certain radius 101, the waveguide azimuth angle is 360°, i.e. the illumination device 1 and the waveguide 20 have circular or elliptical shape. However, in an embodiment, the illumination device 1 and the waveguide 20 have the shape of a circle (or ellipse) section. By way of example, an embodiment is shown in FIG. 2c. The waveguide azimuth angle is indicated with γ. Here, in FIG. 2c, the waveguide azimuth angle γ is in the range of about 45°. Hence, in an embodiment, the waveguide 20 extends over a waveguide azimuth angle γ, relative to a certain radius 101 perpendicular to the central axis 100, to the central axis 100, preferably in the range of about 2-360°. In a preferred embodiment, the waveguide 20 extends over a waveguide azimuth angle γ, relative to a certain radius 101 perpendicular to the central axis, to the central axis 100 in the range of about 20-180°. In another embodiment, the waveguide extends over a waveguide azimuth angle γ, relative to a certain radius 101 perpendicular to the central axis 100, to the central axis of 360° (i.e. a circle (or an ellipse)). Such circle or ellipse sections are indicated with reference 120.

When the waveguide azimuth angle γ is smaller than 360°, preferably, the waveguide 20 further comprises closed waveguide edges 26 and 27 (which may for instance comprise reflectors). Here again, waveguide 20 may be hollow, having a mutually independent open entrance window 23 and edge window 24, and in a specific embodiment closed waveguide edges 26 and 27, but waveguide 20 may also be a solid transparent waveguide 40 having the shape of a circle section (or ellipse section). In the latter embodiment, the waveguide edges 26 and 27 may optionally comprise a reflector. Note that in those embodiments, the term "central axis" 100 is still applied, since also in these embodiments, this axis 100 may appear as the virtual origin of the device light 5.

Further, as mentioned above, the term "substantially round" may also refer to structures that have an angled edge, such as a hexagonal waveguide 20 having an edge with 6 angles and 6 edge portions, and higher order polygonal shapes, such as an octagonal waveguide (8 angels/8 edges), etc. Here, it is especially referred to the regular convex polygons (polygons which are equiangular (all angles are congruent) and equilateral (all sides have the same length), and which are convex), such as a waveguide having the shape of a regular hexagon, octagon, decagon, etc.

Figure 2D:
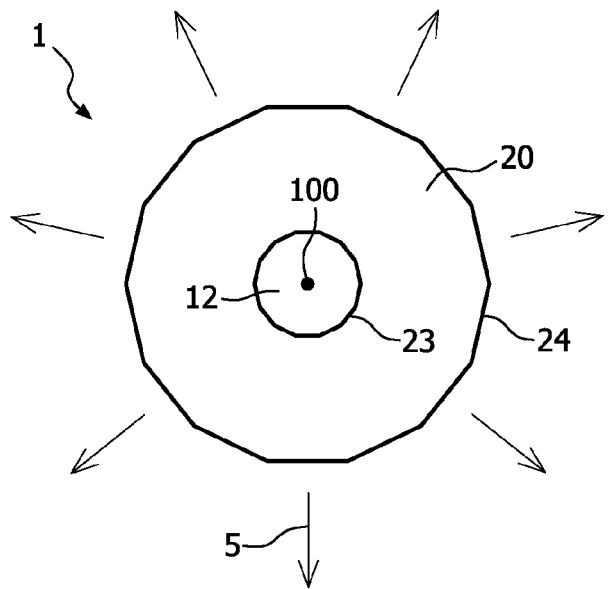
Figure 2E:
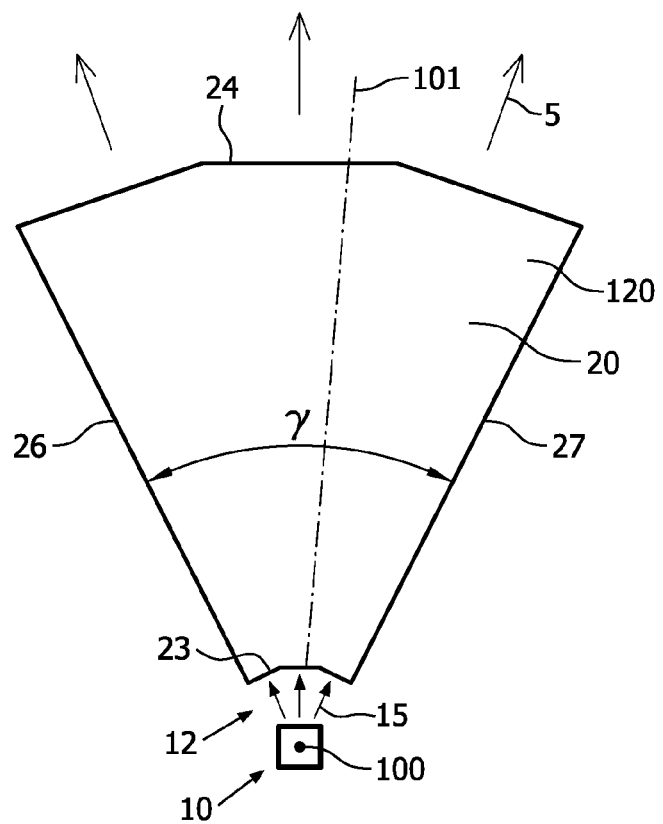

Preferably, when the substantially round structures are used having polygonal shapes, such as a waveguide having a polygonal shape, the number of edges (or angles or vertices) n is at least 6, more preferably at least 10, even more preferably at least about 24. By way of example, two embodiments having angled edges are schematically depicted in FIGS. 2d and 2e. In FIG. 2d, the edge window 24 of waveguide 20 has 14 angles and 14 edges; similarly, the entrance window 23 has 14 angles and 14 edges. FIG. 2e schematically depicts a circle section 120, having 3 edges, i.e. the entrance window 23 has 3 edges and also the edge window 24 has 3 edges. The term edge may also be interpreted as face.

Figure 3A:
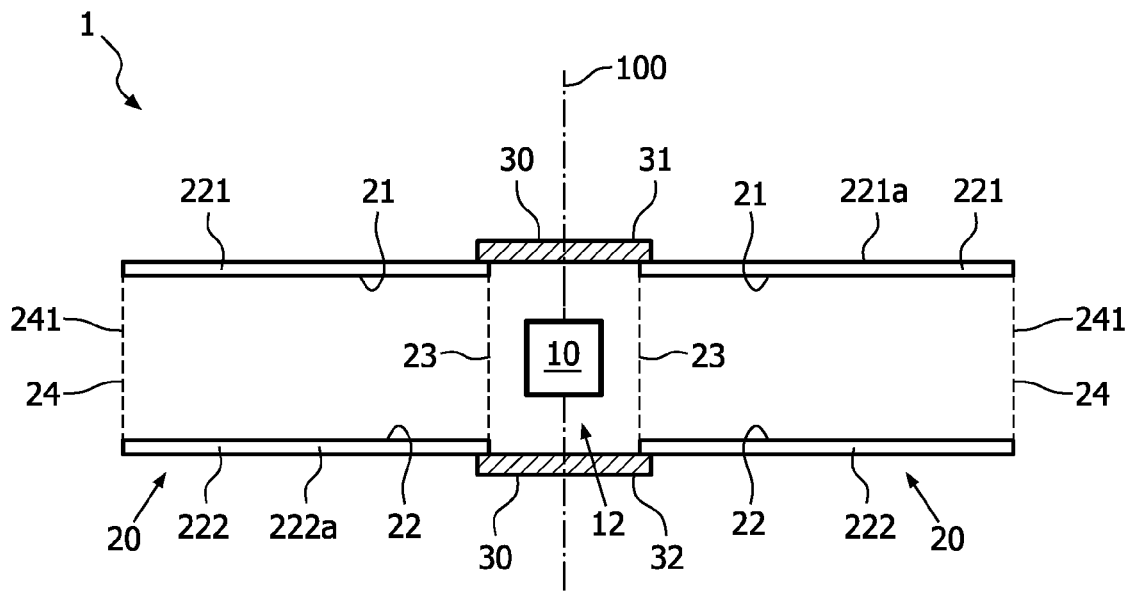
FIGS. 3a-3e schematically depict more detailed side-view embodiments of the edge window of the illumination device according to the invention.
Figure 3B:
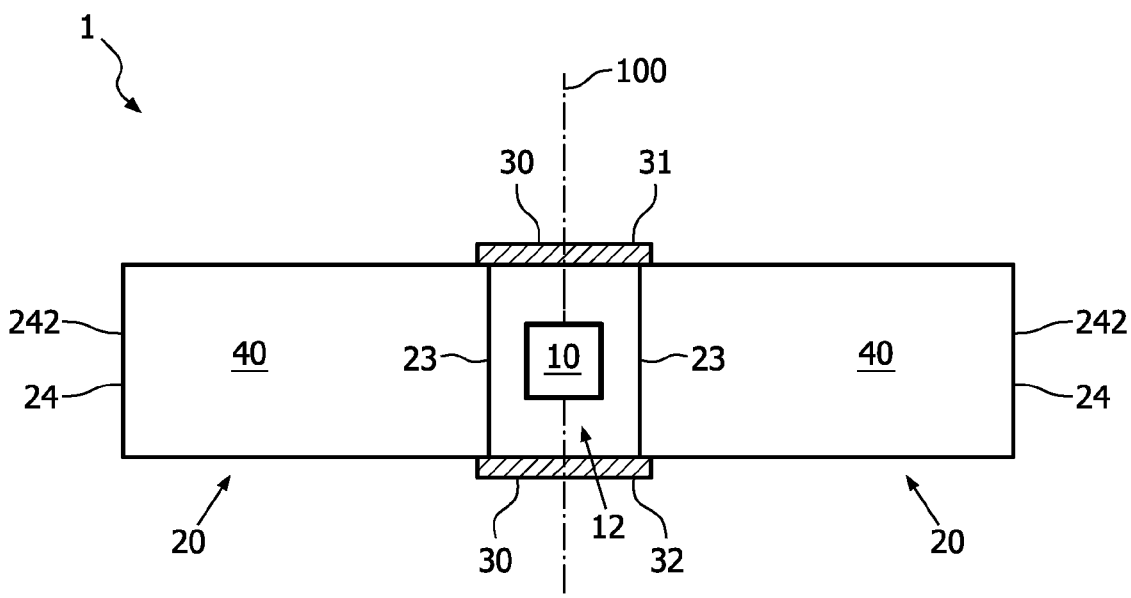

FIGS. 3a-3e schematically depict in more detail side-view embodiments of the edge window 24 of embodiments of the illumination device 1 according to the invention. FIGS. 3a and 3b are substantially the same as FIGS. 1a ("open waveguide") and 1b ("closed waveguide"), and are only depicted for reasons of comparison: the open edge window is indicated with reference 241 (FIG. 3a); the closed edge window parallel to the central axis 100 (and perpendicular to first and second waveguide surfaces 21,22) is indicated with reference 242 (FIG. 3b).

Figure 3C:
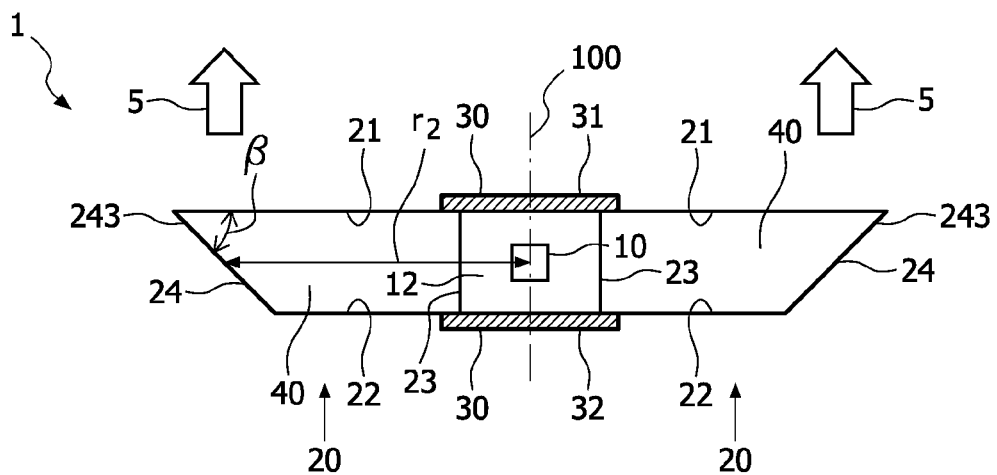

FIG. 3c schematically depicts a side view of an embodiment of the illumination device 1, wherein the edge window 24 is slanted, i.e. it has a slant angle β unequal to 90° relative to one of first waveguide face 21 or second waveguide face 22. Such an edge window 24 is substantially not parallel to the central axis 100. By way of example, in FIG. 3c, the slant angle β is drawn with respect to the first waveguide surface 21, but, as will be clear to the person skilled in the art, the term first and second can be interchanged in this context.

In a preferred embodiment, the edge window 24 has a slant angle β relative to the first waveguide surface 21 or the second waveguide surface 22 in the range of 85-105°. When the slant angle β is 90°, an embodiment as schematically depicted in FIGS. 1b and 3b is obtained (with (in fact unslanted) edge window 242). The term "slanted" or "slanted edge window" relates to edge windows 24 having an angle β unequal to 90° with respect to the first or the second waveguide surface.

In another preferred embodiment, the edge window 24 has a slant angle β relative to the first waveguide surface 21 or the second waveguide surface 22 in the range of about 35-55°, especially in the range of about 40-50°, such as especially about 45°. The slanted edge window 24 having an angle β unequal to 90° is indicated with reference 243 and is shown in FIG. 3c.

Figure 3D:
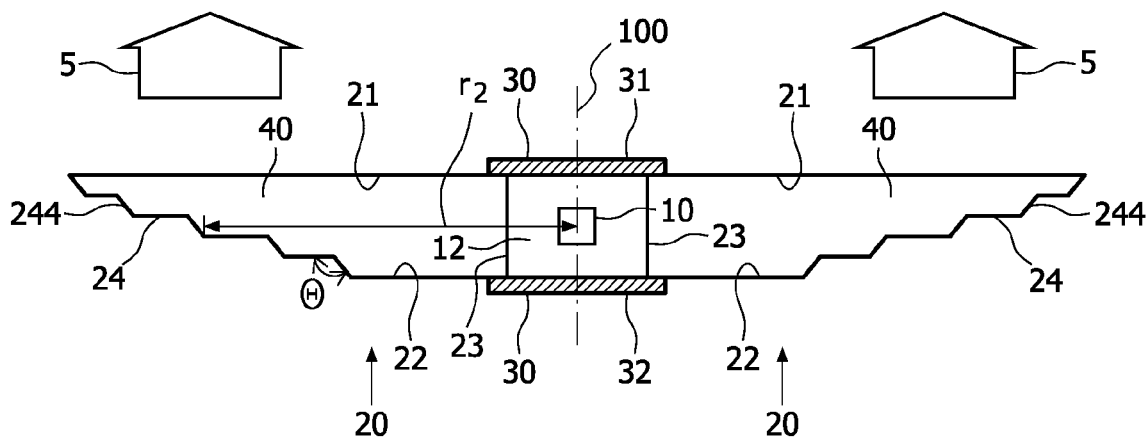

FIG. 3d schematically depicts an embodiment wherein the edge window 24 has a facetted shape, indicated as facetted edge window 244. The facets may have facet angles θ of 90°, but also facet angles θ unequal to 90 degrees are possible. In the latter case a slanted facetted edge window is obtained. Such a latter embodiment is schematically depicted in FIG. 3d. Hence, in an embodiment, the waveguide 20 comprises a facetted edge window 244, which is optionally also at least partially slanted.

Note that all edge window facets could be either transmissive or reflective, or one or more of them could be transmissive and one or more of them could be reflective.

Figure 3E:
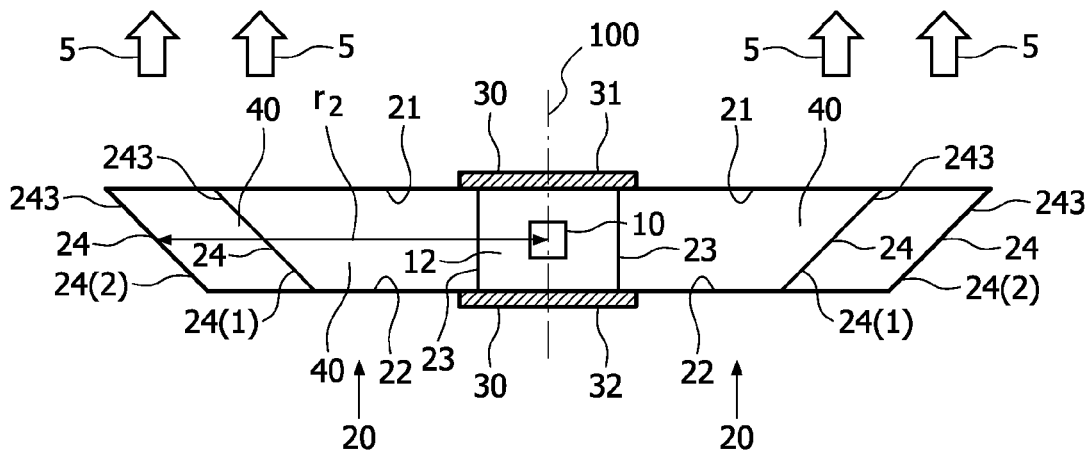

FIG. 3e schematically depicts an embodiment wherein the waveguide 20 comprises a plurality (i.e. ≧2) of edge windows 24. In the schematic embodiment illustrated in FIG. 3e, two edge windows 24 are provided, indicated with reference 24(1) and 24(2). In general, such edge windows will be slanted edge windows, as indicated in the Figure, although a combination of one or more slanted edge windows 243 and a perpendicular edge window 241 may also be possible (i.e. a combination of the embodiments schematically depicted in FIGS. 3b and 3e). Likewise, a combination of one or more slanted windows 23 and facetted edge window 243 may also be possible. Hence, in an embodiment, the waveguide 20 comprises a plurality of edge windows 24. Each edge window 24 is arranged to promote outcoupling of the light source light 15 out of the waveguide 20 to outside the illumination device 1.

The radii r2 and r21 and r22 are especially calculated with respect to the outermost edge window 24 (in FIG. 3e edge window 24(2)).

Figure 4A:
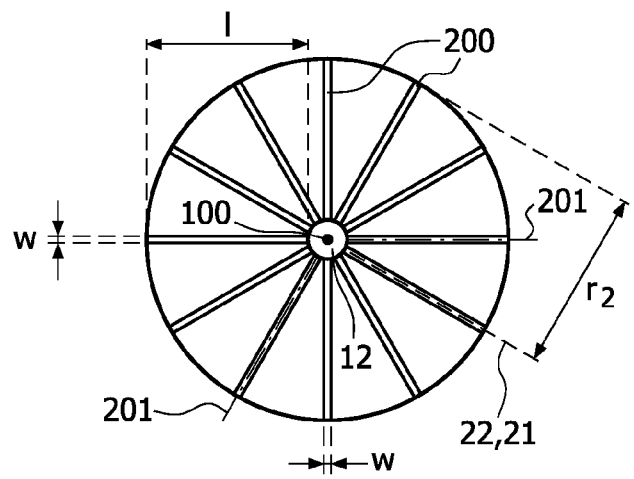
FIGS. 4a-e schematically depict the elongated structures of the waveguide.

Above, the device 1 has been described in general. Now, the elongated structures according to a preferred embodiment of the invention will be described, with reference to FIGS. 4a-4f. FIGS. 4a-e schematically depict the elongated structures of the waveguide; FIG. 4f schematically depicts in a perspective view an embodiment of the illumination device according to the invention, and FIG. 4g schematically depicts an embodiment of the light source of the illumination device according to the invention.

As mentioned above, in a preferred embodiment, the first waveguide surface 21 or the second waveguide surface 22 or both the first waveguide surface 21 and the second waveguide surface 22 further comprise a plurality of elongated structures 200, each having an elongation axis 201 substantially parallel to a radius 101 perpendicular to the central axis 100.

The phrase "radius 101 perpendicular to the central axis 100" refers to an arbitrary radius or to arbitrary radii. The rays from the light source 10 substantially follow the radii 101, i.e. are parallel to a radius 101. The entrance window 23 is, in the herein schematically depicted embodiments, substantially perpendicular to such radii 101, and the first waveguide surface 21 and the second waveguide surface 22 are substantially parallel to such radii 101.

The elongated structures are substantially parallel to these radii (i.e. substantially perpendicular to the central axis 100). The term "elongated structure" refers to structures of the waveguide surfaces 21 and/or 22, which provide an irregularity to the substantially flat surfaces 21 and/or 22. Such structures may have a height h in the range of about 0.05 mm to about d, but preferably they lie in the range of about 0.05 mm to about 0.5 d, even more preferably in the range of about 0.05 mm to about 0.1 d. Characteristic heights h of the elongated structures are in the range of about 0.05-2 mm. Likewise, characteristic bottom widths, indicated with reference w, of the elongated structures 200, may also be in the range of about 0.05-2 mm.

The width, or bottom width w, may vary along the radius 101. In FIG. 4a, an embodiment is shown wherein the waveguide surface 21 or 22 (an embodiment of one (or both) of them is schematically depicted here) is not entirely "filled" with elongated structures 200. By varying the elongated structure height h and/or by varying the elongated structure bottom width w, along the radii 101, one may be able to completely fill the respective waveguide surface 21,22 with elongated structures 200 (see also FIG. 4f).

Such elongated structures 200 add additional reflective surfaces 202 to the waveguide surfaces 21 and/or 22. It seems that by reflection off these elongated structures 200, the azimuth direction of a light source light ray is mixed with the direction perpendicular to the waveguide 20. While travelling in the radial direction, the light ray is collimated only in the azimuth direction. The mixing of the two directions ensures that both directions of the light source light 15 will become collimated. Consequently, the beam collimation in both directions will improve with increasing radius, without changing the other optical components, in particular without substantially increasing the thickness of the device 1.

Preferably, a part of the total number of elongated structures have a length 1 in the range of about 50-100% of the radial length of the waveguide, i.e. the difference in length between the edge window radius r2 (or r21 and r22) and the entrance window radius r1 of the first waveguide surface 21 and/or second waveguide surface 22, respectively. In the schematic embodiment of FIG. 4f, all elongated structures 200 have a length l of about 100% of the radial length of the waveguide, i.e. said length of the first waveguide surface 21 and/or second waveguide surface 22, being r21 respectively r22.

Due to the nature of the illumination device 1, the preferred elongated structures 200 have an elongation axis 201, preferably substantially parallel to a certain radius 101 perpendicular to the central axis 100, and hence also substantially parallel to a ray (or the radius) of the light source 10. Embodiments of the elongated structures 200 are shown in a schematic top view in FIG. 4a.

Figure 4B:
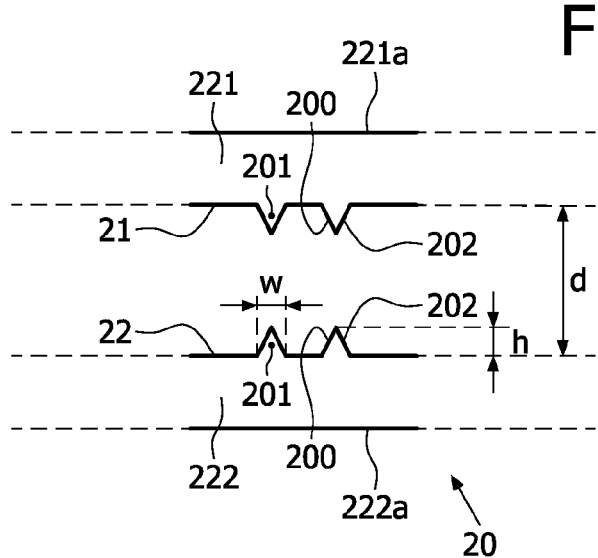
Figure 4C:
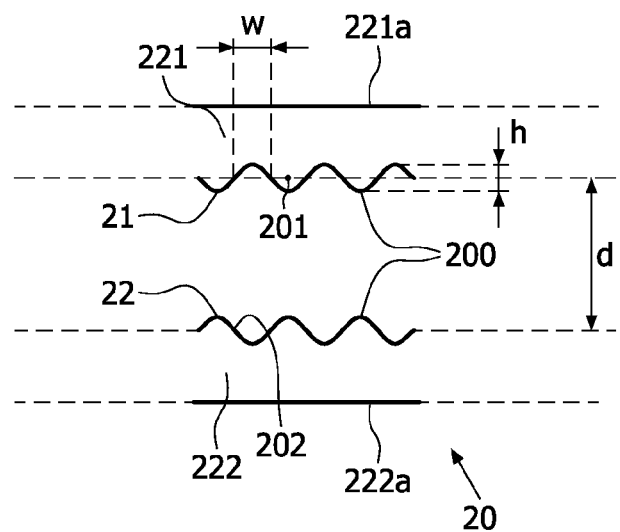
Figure 4D:
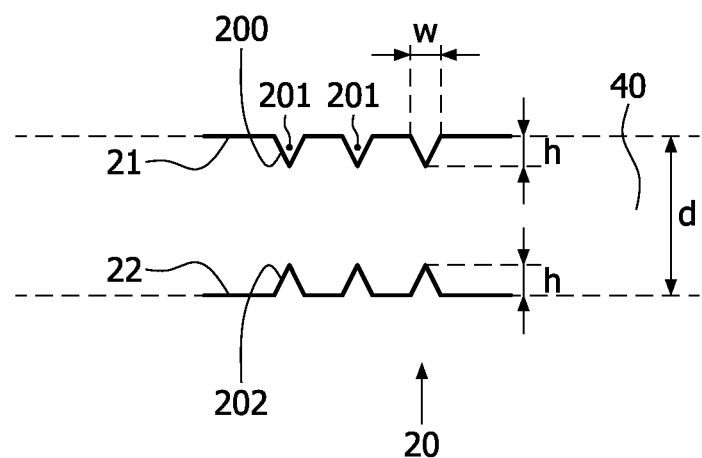
Figure 4E:
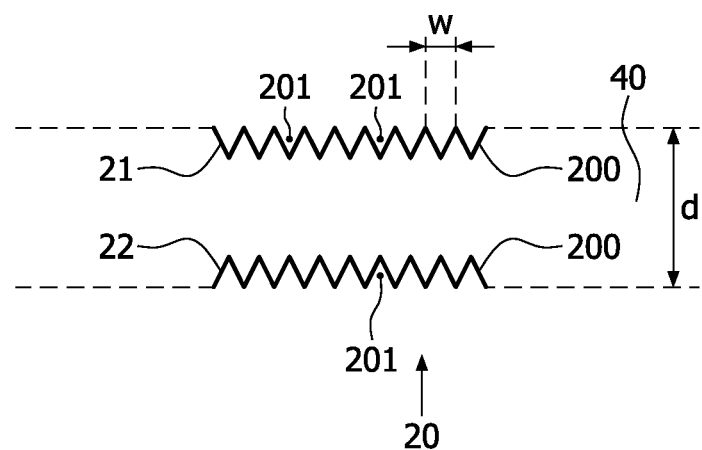
Figure 4F:
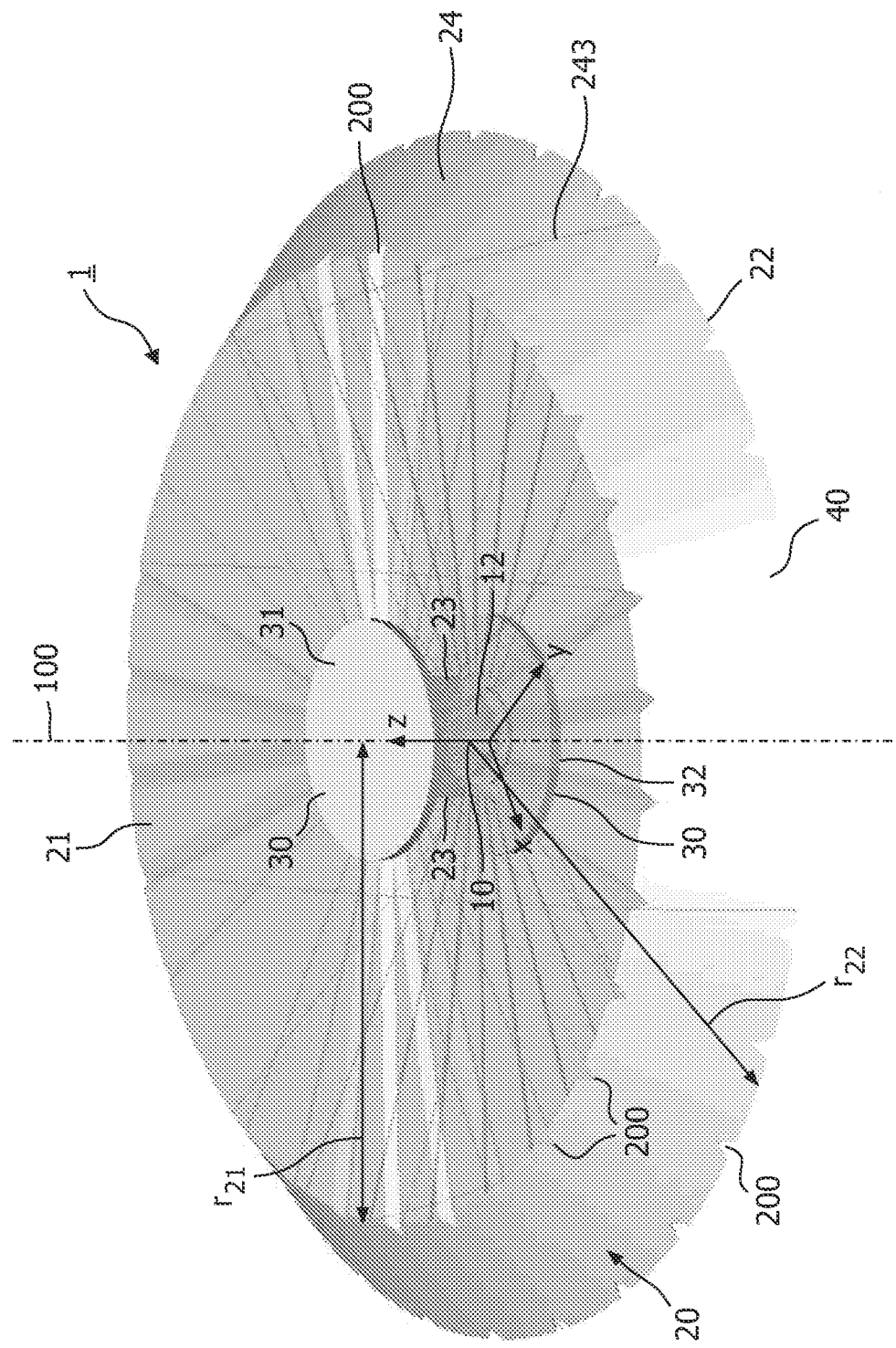
FIG. 4f schematically depicts in a perspective view an embodiment of the illumination device according to the invention, and FIG. 4g schematically depicts an embodiment of the light source of the illumination device according to the invention.

Schematic side views are shown in FIGS. 4b and 4c, wherein the intermediate space between the first and second surfaces 21 and 22 may for instance be air ("open waveguide"). FIGS. 4d and 4e schematically depict side-view embodiments wherein the waveguide 20 comprises the solid transparent waveguide 40.

The elongated structures 200 may for instance have v-shaped profiles (FIGS. 4b, 4d and 4e) or may for instance have curved profiles such as sinusoid-like profiles, as schematically indicated in FIG. 4c. The elongated structures 200 may be directly adjacent one another, as in FIG. 4e, but there may also be a distance between adjacent elongated structures 200. Whether the elongated structures 200 are directly adjacent one another or there is a distance between neighbouring elongated structures 200 may also vary along radii 101 (compare for instance the schematic drawings 4f and 6a/6b). As mentioned above, the elongated structures 100 may have a constant width w and/or height h, or the width w and/or height h may vary, independently of each other, over a radius 101 of the waveguide 20. In this way, the entire surface of the first waveguide surface 21 and/or the second waveguide surface 22 may comprise the elongated structures 200, but it may also be chosen to leave spaces between two adjacent elongated structures 200.

The elongated structures 200 may for instance easily be provided by providing grooves into the first and/or second surfaces 21,22 of especially a solid transparent waveguide 40. By introducing V-shaped grooves or sine-shaped grooves or other types of grooves, the elongated structures 200 are provided relatively easily with reflective surfaces 202. Such grooves may be obtained by etching or carving grooves, thereby obtaining the elongated structures 200. However, other methods known to the person skilled in the art may also be applied, like injection moulding or hot embossing or replication of the elongated structure.

FIG. 4f schematically depicts in more detail an embodiment of the illumination device according to the invention, with slanted edge window 24 (243) and elongated structures 200 extending from the entrance window 23 to the edge window 24 for both the first and the second surfaces 21,22, respectively. This Figure shows an embodiment of the invention comprising a circular waveguide 20, where light 15 is coupled in at the centre (i.e. light source cavity 12), and coupled out at the outer rim (i.e. slanted edge window 243). The top and bottom sides, i.e. the first and the second waveguide surfaces 21,22 of the waveguide 20, contain V-shaped grooves with a 90° top angle, extending radially from centre to outer rim.

In a preferred embodiment, the waveguide 20 comprises at least 1 elongated structure 200 per 10° of waveguide azimuth angle γ, especially about 1 to 5 elongated structures 200 per 10° of waveguide azimuth angle γ.

FIG. 4g schematically depicts an embodiment of the light source 10, comprising a plurality of LEDs 18 (especially ≧6 LEDs 18), which are arranged in a circle. The LEDs 18 may provide white light or coloured light or the individual LEDs 18 may provide light of different colours, such as yellow and blue, or RGB (red, green and blue) etc. Hence, in an embodiment, the plurality of LEDs 18 may be arranged in a circular LED array, and in a further embodiment, the waveguide 20 may be substantially circular, which provides a structure that has an improved optical performance. The LEDs 18 may be side emitting LEDs, which results in a compact design as well as efficient incoupling of light into waveguide 20.

Figure 5:
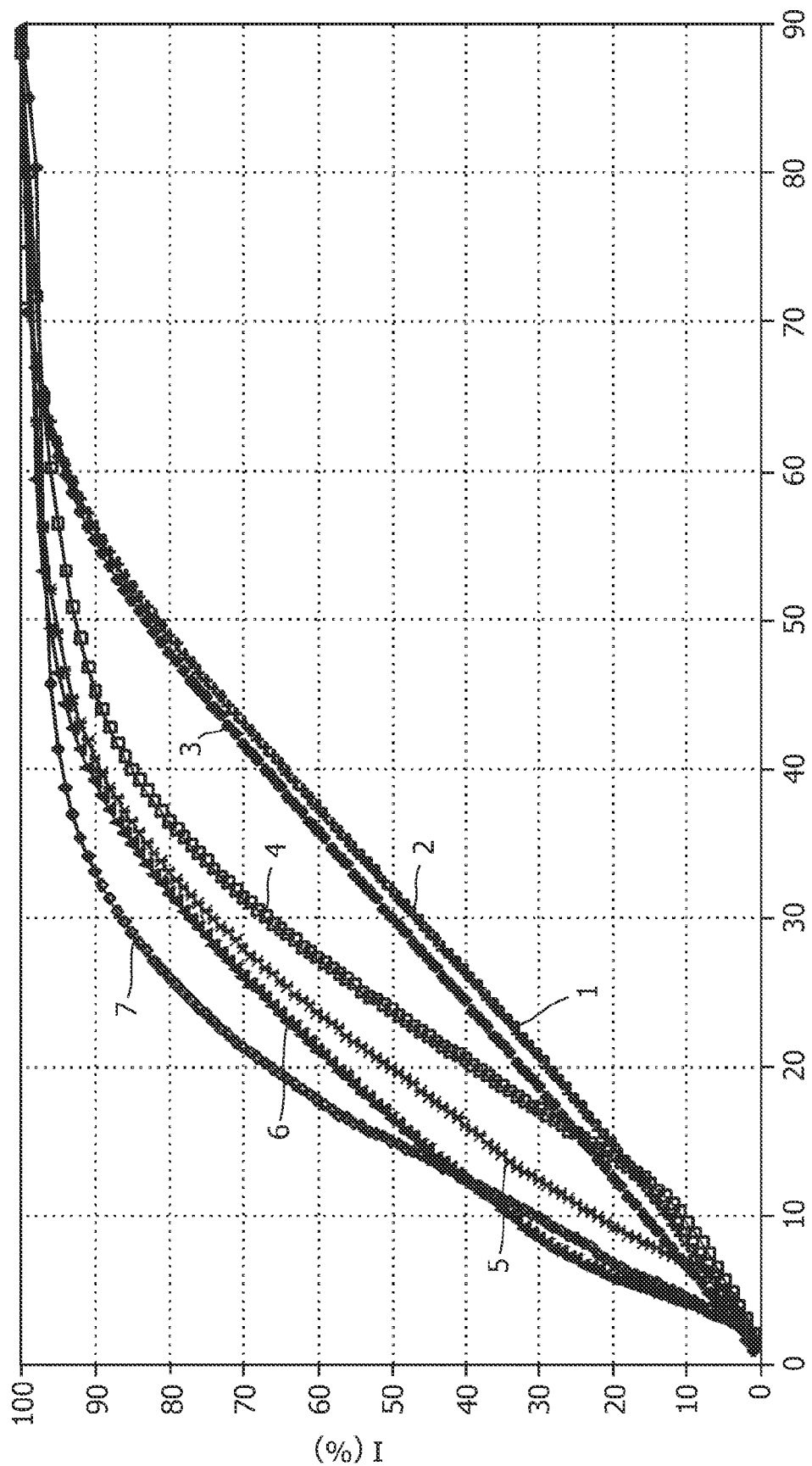
FIG. 5 depicts the integrated intensity as a function of the polar angle (relative to the central axis) of embodiments of the illumination device with different radii and with or without the elongated structures.

FIG. 5 depicts the integrated intensity as a function of the polar angle (relative to the central axis), which is the angle relative to the central axis 100, for a number of embodiments of the illumination device with a slant angle β of 45°. Assuming a polar angle of 0°, the intensity is measured along the direction of the central axis 100 of the illumination device 1; at a polar angle of 90°, the intensity is measured along a direction perpendicular to the central axis 100 (i.e. at a position in line with a certain radius 101). The integrated intensity at a given polar angle is the total flux in the range between 0 degrees and that polar angle. Several embodiments were produced, with different radii r2, with or without the elongated structures 200, but all with a slant angle β of 45°. In table 1, the relevant device parameters are indicated for each curve:

TABLE 1 relative integrated intensity (%) dependent upon the polar angle (relative to the central axis) of illumination device 1 with 45° slanted edge window 24 with PMMA waveguide 20

| Radius (r2) (mm) | Grooves |
|---|---|
| 1  10 | — |
| 2  20 | — |
| 3  50 | — |
| 4  10 | 30 (12 degrees azimuth separation between grooves) |
| 5  20 | 30 |
| 6  50 | 30 |
| 7  50 | 60 Same as 6 with twice as many grooves (6 degrees azimuth separation) |

The curves 4-7 in FIG. 5 clearly show an improved collimation compared to the circular light guide without elongated structures 200 of curves 1-3. Another important property of the invention is that the overall beam collimation (the combined effect of collimation in the azimuth direction and in the radial direction) now even improves with increasing radius (r2) of the waveguide. The best result, with a radius of 50 mm and twice the number of structures 200 compared to curve 6, is depicted in curve 7. In the optimum case, the whole surface is covered with structures 200, e.g. it substantially does not contain horizontal facets (see also FIGS. 6a/6b).

The whole surface 21 and/or 22 may be covered by using structures 200 with outwardly diverging width w. Such structures 200 may "automatically" be formed, since structures 200 of constant width w and height h will have more overlap at the centre than at the outer edge 24. In general, there are two basic options: either to keep the groove peaks at a constant level, or to keep the groove valleys at a constant level. It is also possible to avoid overlap and allow the number of grooves to increase in the direction from the inner radius to the outer radius.

As discussed above, the elongated structures 200 need not be V-grooves with a 90 degrees top angle. For example, sinusoidal patterns or other curved patterns may also be effective.

The term white light used herein is known to the person skilled in the art. It especially relates to light having a correlated colour temperature (CCT) between about 2,000 and 20,000 K, especially 2700-20,000 K, and for general lighting especially in the range of about 2700 K and 6500 K, and for backlighting purposes especially in the range of about 7,000 K and 20,000 K, and especially within about 15 SDCM (standard deviation of colour matching) from the BBL (black body locus), especially within about 10 SDCM from the BBL, even more especially within about 5 SDCM from the BBL.

The term "blue light" or "blue emission" especially relates to light having a wavelength in the range of about 410-490 nm. The term "green light" especially relates to light having a wavelength in the range of about 500-570 nm. The term "red light" especially relates to light having a wavelength in the range of about 590-6500 nm. The term "yellow light" especially relates to light having a wavelength in the range of about 560-590 nm.

These terms do not exclude that especially the luminescent material may have a broad band emission with wavelength(s) outside the range of for instance about 500-570 nm, about 590-6500 nm, and about 560-590 nm, respectively. However, the dominant wavelength of emissions of such luminescent materials (or of the LED) will be found within the herein given ranges. Hence, the phrase "with a wavelength in the range of" especially indicates that the emission may have a dominant emission wavelength within the specified range.

EXAMPLE

An illumination device 1 was made, comprising a light source 10 as schematically depicted in FIG. 4g, with 24 Rebel LEDs from LumiLEDs, of which 18 neutral white LEDs 80 lm@1 W LXML-PWN1-0080 and 6 amber LEDs 65 lm@2 W LXML-PL01-0030. The light source 10 emits in radial directions, see FIG. 4g.

A circular waveguide 20 is arranged around the light source 10, said waveguide having an inner radius r1 of 20 mm, and an outer radius r2 of about 75 mm (in fact radius r21 is 75 mm, since the edge window 24 is slanted). The slant angle of edge window 24 is 45° (radius r22 is thus slightly shorter than radius r21). There is a first cap 31 (here, a reflector) at one side, and a reflecting surface at the other side (not depicted), which is part of an aluminum mechanical substrate that supports the system, and acts as a heat sink. The circular waveguide 20 substantially consists of PMMA (and is thus made of a solid transparent material 40). The thickness d of the waveguide 20 is 5 mm.

Only first waveguide surface 22 comprises 200 V-shaped grooves (elongated structures 200) along radial-direction radii 101 (although both waveguide surfaces may comprise the elongated structures), having 90° top angles, and a maximum height (or depth) h of 1.0 mm. The grooves are parallel to the plane of the light guide 20 and there are overlapping grooves at the centre side of the guide 20. The height increases with radial distance from entrance surface 23, thereby providing a waveguide surface 21 entirely comprising elongated structures 200, without substantially flat facets between two adjacent elongated structures (see also FIG. 4e). In this way, an illumination device 1 is obtained, similar to the one depicted in FIG. 4f (except for the elongated structure density and the fact that only one waveguide surface comprises the elongated structures 200). Light source light 15 (not depicted) substantially travels through the waveguide 20 and is reflected at edge window 24 (slanted edge window 243) and leaves the waveguide 20 from first waveguide surface 21, close to the edge window 24, as indicated in FIG. 6b.

The device 1 according to this example is schematically depicted in FIGS. 4g (light source 10), 6a and 6b.

The term "substantially" used herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in sequences other than those described or illustrated herein.

The devices used herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A substantially round illumination device, comprising:
a light source arranged to radially generate light, and
a substantially planar and transparent waveguide arranged to collimate the radially generated light, the waveguide having
a first waveguide surface,
a second waveguide surface,
a substantially round waveguide entrance window,
a substantially round waveguide edge window, and
a central axis,
wherein at least one of the first and second waveguide surfaces comprise a plurality of elongated structures each having an elongation axis substantially parallel to a radius perpendicular to the central axis, and
wherein the waveguide entrance window at least partially encloses the light source and is arranged to receive the radially generated light from the light source.

2. The illumination device according to claim 1, wherein the illumination device has a circular shape or elliptical shape.

3. The illumination device according to claim 1, wherein the illumination device has a polygonal shape having at least 6 edges.

4. The illumination device according to claim 1, wherein the waveguide entrance window has an entrance window radius (r1) relative to the central axis, and wherein the waveguide edge window has an edge window radius (r2) relative to the central axis, and wherein the ratio of the edge window radius (r2) and the entrance window radius (r1) is equal to or larger than 1.5.

5. The illumination device according to claim 1, wherein the elongated structures have v-shaped profiles in cross-section transverse to the axis.

6. The illumination device according to claim 1, wherein the elongated structures have curved profiles in cross-section transverse to the axis.

7. The illumination device according to claim 1, wherein the waveguide extends over a waveguide azimuth angle (γ), relative to the radius perpendicular to the central axis in the range of 2-360°, and wherein the waveguide comprises at least one elongated structure per 10° of the waveguide azimuth angle (γ).

8. The illumination device according to claim 1, wherein the edge window has a slant angle (β) relative to the first waveguide surface or the second waveguide surface in the range of 85-105°.

9. The illumination device according to claim 1, wherein the edge window has a slant angle (β) relative to the first waveguide surface or the second waveguide surface in the range of 35-55°.

10. The illumination device according to claim 1, wherein the waveguide comprises a facetted edge window.

11. The illumination device according to claim 1, wherein the waveguide comprises a plurality of edge windows.

* * * * *